(12) United States Patent
Snapp et al.

(10) Patent No.: US 8,559,602 B2
(45) Date of Patent: Oct. 15, 2013

(54) METHOD FOR DETERMINING TERMINATION OF AN EMERGENCY SERVICE CALL

(75) Inventors: John Lawrence Snapp, Westminster, CO (US); Jodee Marie Glass, Lyons, CO (US); Anne Marie DeGraff, Fort Lupton, CO (US)

(73) Assignee: West Corporation, Omaha, NE (US)

( * ) Notice: Subject to any disclaimer, the term of this patent is extended or adjusted under 35 U.S.C. 154(b) by 629 days.

(21) Appl. No.: 12/727,439

(22) Filed: Mar. 19, 2010

(65) Prior Publication Data

US 2011/0228911 A1 Sep. 22, 2011

(51) Int. Cl.
*H04M 11/04* (2006.01)
(52) U.S. Cl.
USPC ............................. 379/45; 379/404.1
(58) Field of Classification Search
USPC ............... 379/37, 45; 455/404.1, 404.2
See application file for complete search history.

(56) References Cited

U.S. PATENT DOCUMENTS

| | | | |
|---|---|---|---|
| 7,123,693 B2 | 10/2006 | Nelson et al. | |
| 7,155,201 B2 | 12/2006 | Saucedo et al. | |
| 7,177,399 B2 | 2/2007 | Dawson et al. | |
| 7,292,864 B1 * | 11/2007 | Al-Khashti et al. | 455/456.1 |
| 8,442,481 B2 * | 5/2013 | Maier et al. | 455/404.2 |
| 2005/0053209 A1 * | 3/2005 | D'Evelyn et al. | 379/111 |
| 2006/0128358 A1 * | 6/2006 | Islam et al. | 455/404.2 |
| 2006/0270464 A1 * | 11/2006 | Daniels et al. | 455/569.1 |
| 2006/0276168 A1 * | 12/2006 | Fuller et al. | 455/404.2 |
| 2009/0054082 A1 * | 2/2009 | Kim et al. | 455/456.2 |
| 2012/0021716 A1 * | 1/2012 | Fuller et al. | 455/404.1 |
| 2012/0252397 A1 * | 10/2012 | Kumar | 455/404.1 |

* cited by examiner

*Primary Examiner* — Simon Sing
*Assistant Examiner* — Solomon Bezuayehu

(57) ABSTRACT

A method for determining termination of an emergency service call; the emergency service call being connected with an emergency service answering entity in an emergency service network employing a locating unit for ascertaining a geographic origin for the emergency service call; the method including: (a) presenting a query signal from the emergency service answering entity during the emergency service call soliciting a responsive signal from the locating unit relating to the geographic origin; (b) if the query signal relating to the geographic origin is received by the locating unit, considering that the emergency service call is not terminated; and (c) if no query signal relating to the geographic origin is received by the locating unit, considering that the emergency service call is terminated.

20 Claims, 2 Drawing Sheets

METHOD FOR DETERMINING TERMINATION OF AN EMERGENCY SERVICE CALL

FIELD OF THE INVENTION

The present invention is directed to emergency service telecommunication systems, and especially to non-landline emergency service telecommunication systems employing pseudo Automatic Number Identification (pANI) identifiers in operation.

BACKGROUND OF THE INVENTION

Telephony standards relating to non-landline operations such as, by way of example and not by way of limitation, cellular telephone operations and Voice over Internet Protocol (VoIP) operations, have mandated that an Automatic Location Identification database (ALI) shall maintain connectivity with a positioning center that is able to provide current location information for a non-landline call. Using currently extant technology, a positioning center provides a caller's location and callback number to the ALI, and the ALI passes that information to a requesting Public Safety Answering Point (PSAP; sometimes referred to as a Public Safety Answering Position). An ALI may maintain connectivity with more than one positioning center using various interface types, both standard and non-standard. By way of example and not by way of limitation, a positioning center may include (1) a Gateway Mobile Location Center (GMLC) that retrieves forwards, stores and controls emergency position data within a GSM (Group Speciale Mobile; or Global System for Mobile communications) location network; (2) a Mobile Position Center (MPC) that is a positioning center for retrieving, forwarding, storing and controlling emergency position data within an ANSI (American National Standards Institute) network; or (3) a Voice over Internet Protocol (VoIP) positioning center (VPC) that retrieves, forwards, stores and controls emergency position data with a VoIP network.

During the course of an emergency PSAP will try to determine location of the calling party so that decisions can be made regarding where to send aid or the like. In a landline call, obtaining an address may be carried out by simply consulting a local Automatic Numbering Identification (ANI) database or a local ALI database to obtain caller location information. In the case of an emergency service call placed by a mobile device such as, by way of example and not by way of limitation, a wireless mobile device or a VoIP device, it may be necessary that reliance be placed upon a Position Determining Entity (PDE).

Systems relying on a PDE for location information relating to a calling party employ a pseudo Automatic Number Identification (pANI) identifier to assure that the PDE will have a call back number for the requesting PSAP. A pANI may also be referred to as Emergency Service Routing Digits (ESRD). The terms refer to a number used in place of the mobile phone number of the caller that permits routing information to be sent to a wireline 9-1-1 system via an SS7 network. A pANI may be embodied in an Emergency Service Routing Key (ESRK) for use with wireless mobile emergency call networks. A pANI may be embodied in an Emergency Service Query Key (ESQK) for use with VoIP networks. An ESRK/ESQK is commonly a 10-digit routable—but not necessarily dialable—number that is used for routing as well as a correlator, or key, for mating data that is provided to a PSAP via different paths. By way of example and not by way of limitation, data may be provided to a PSAP via a voice path and via an ALI data path.

The emergency service keys ESRK/ESQK are commonly used to query an ALI database for location of a given emergency caller. An emergency service key ESRK/ESQK may be provided to a selective router associated with the PSAP and may operate as the calling number/ANI for calls to the PSAP associated with a PDE query. The emergency service key is used by a selective router as a key to selective routing data associated with an emergency call. The emergency service key is delivered by the selective router to an associated PSAP as the calling number/ANI for the emergency call and is used by the PSAP to request ALI information indicating location of the device making the emergency call (i.e., the emergency caller).

Solutions and systems commonly in place today establish a finite pool of emergency service keys ESRK/ESQK for allocation during operation. Generally, one ESRK/ESQK is issued and employed for each respective extant emergency call. When an emergency call is completed, the associated ESRK/ESQK is returned to the pool for later use. As may be appreciated by one skilled in the art of emergency communication network design, it is possible to exhaust the number of available ESRK/ESQKs if the number of extant emergency calls is too great, either because of a high number of calls, or because too many emergency service calls have too great a duration, or because of a combination of a high number of calls and longer duration calls. Some systems use timers to assure that an emergency service key ESRK/ESQK is available for reassignment. However, timers are necessarily based upon estimated call duration. Cutting an emergency call off after an arbitrary (estimated) time may cut off an emergency caller from urgently need assistance. Such a situation may have disastrous—even deadly—consequences, no matter how well-intentioned the estimate may have been. Consequences may be particularly disastrous if there is updated location information available after an emergency routing key ESRK/ESQK is returned to the pool.

Increasing the number of emergency service keys ESRK/ESQK in a pool is inefficient and may lead to number exhaustion for emergency service keys ESRK/ESQK system-wide.

There is a need for a method for determining termination of an emergency service call.

There is a need for a method for managing emergency service keys that substantially accounts for actual duration of emergency service calls.

SUMMARY OF THE INVENTION

A method for determining termination of an emergency service call; the emergency service call being connected with an emergency service answering entity in an emergency service network employing a locating unit for ascertaining a geographic origin for the emergency service call; the method including: (a) presenting a query signal from the emergency service answering entity during the emergency service call soliciting a responsive signal from the locating unit relating to the geographic origin; (b) if the query signal relating to the geographic origin is received by the locating unit, considering that the emergency service call is not terminated; and (c) if no query signal relating to the geographic origin is received by the locating unit, considering that the emergency service call is terminated.

A method for determining whether a routing expression associated with a respective emergency service call may be disassociated with the respective emergency service call; the respective emergency service call being connected with an emergency service answering entity in an emergency service network employing a locating unit for ascertaining a geographic origin for the respective emergency service call; the method including: (a) presenting a query signal from the emergency service answering entity soliciting a responsive signal from the locating unit relating to the geographic origin; (b) if the query signal relating to the geographic origin is received by the locating unit, considering that the routing expression associated with the respective emergency service call may not be disassociated with the respective emergency service call; and (c) if no query signal relating to the geographic origin is received by the locating unit, considering that the routing expression associated with the respective emergency service call may be disassociated with the respective emergency service call.

It is, therefore, a feature of the present invention to provide a method for determining termination of an emergency service call.

It is another feature of the present invention to provide a method for managing emergency service keys that substantially accounts for actual duration of emergency service calls.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

For purposes of illustration, by way of example and not by way of limitation, the present invention will be discussed in the context of an emergency service network in the United States, commonly referred to as an E9-1-1 network. The teachings of the present invention are equally applicable, useful and novel in other special number calling systems, such as maintenance service networks, college campus security networks, emergency service networks in countries other than the United States and other networks.

In the following detailed description, specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
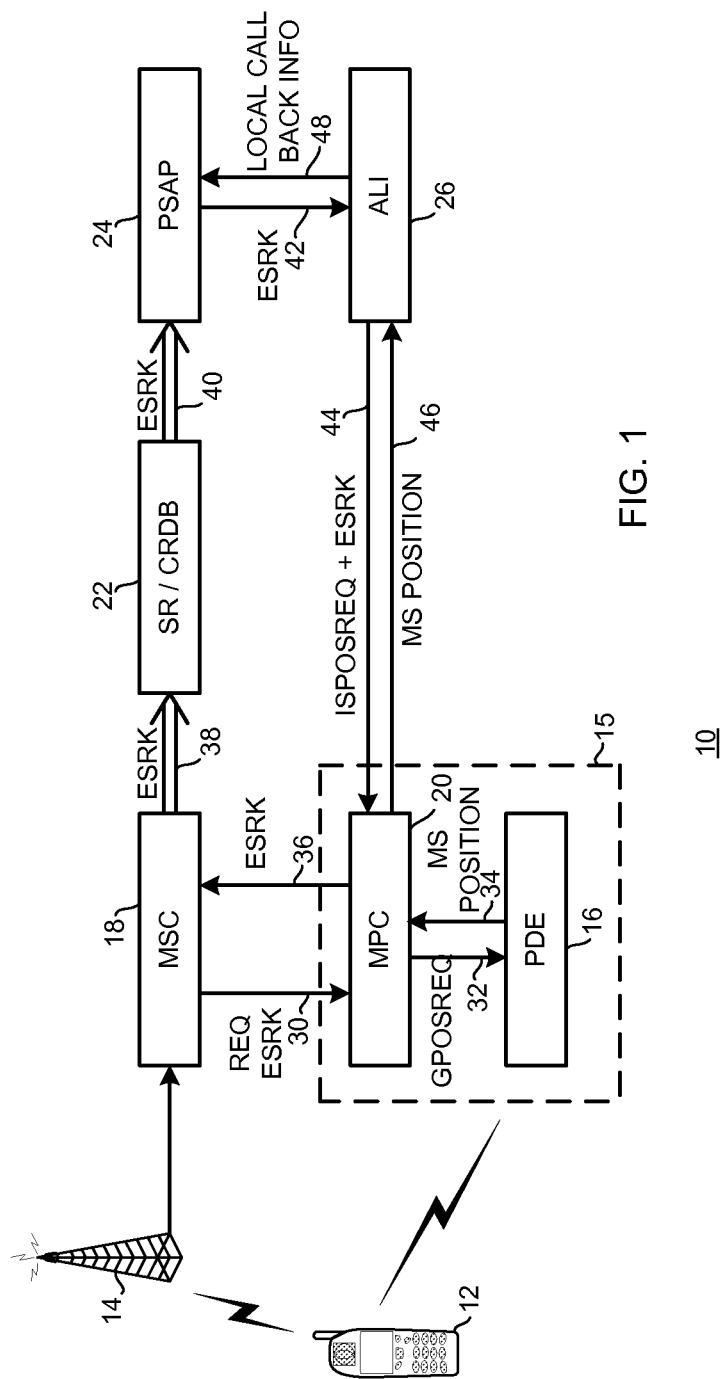
FIG. 1 is a schematic diagram illustrating a system in which the present invention may be advantageously employed.

FIG. 1 is a schematic diagram illustrating a system in which the present invention may be advantageously employed. In FIG. 1, an emergency service communication system 10 includes a mobile calling unit 12 coupled for wireless communication with a serving communication tower 14 and with a locating unit 15. Locating unit 15 includes a Position Determining Entity (PDE) 16 communicatingly coupled with a Mobile Positioning Center (MPC) 20. Locating unit 15 may employ one or more technologies to ascertain geographic position of calling unit 12 such as, by way of example and not by way of limitation, determination of a mobile calling cell at serving communication tower 14 that is serving calling unit 12, Global Positioning System (GPS), Angle of Arrival (AOA) calculations relating to communications received from calling unit 12 or other technologies or techniques. AOA calculations may be carried out by locating unit 15 in cooperation with other loci having known locations, or may be carried out by locating unit 15 over a period of time.

Serving communication tower 14 is coupled with a Mobile Switching Center (MSC) 18. When MSC 18 receives an emergency service call, such as a 9-1-1 call, from mobile calling unit 12, a communication (REQESRK) is effected with MPC 20 to request an Emergency Service Routing Key (ESRK), as indicated by a communication line 30.

An ESRK may be embodied in a ten-digit routable (but not necessarily dialable) number that is used not only for routing but also as a correlator, or key, for the mating of data that is provided to a Public Safety Answering Point (PSAP; sometimes referred to as a Public Safety Answering Position) by different paths, such as a voice path an Automatic Location Identification (ALI) data path. ALI is a feature of E9-1-1 (Enhanced 9-1-1) service that displays the name and address associated with the number of a phone used to dial 9-1-1. ALI is commonly embodied in a database managed by a database provider.

The term ESRK may be used to indicate operational environments where the "routing" digits are assigned on a per-destination-PSAP basis. An ESRK may be advantageously employed to provide a "call back" number by which a PSAP may contact an emergency caller. In an emergency system communication system service mobile callers, such as emergency communication system 10 (FIG. 1), an ESRK may be configured to correlate position-related data with a call so that a PSAP may direct emergency service resources to a location from which a call originates.

MPC 20 may respond to REQESRK communication 30 by initiating a communication (GPOSREQ), as indicated by a communication line 32, with a PDE 16 to request information relating to a geographic position relating to the particular mobile calling unit 12 that placed the call occasioning the request for an ESRK by MSC 18. PDE 16 responds to communication GPOSREQ 32 by providing a communication MSPOSITION 34 to MPC 20. MPC 20 thereafter provides an ESRK communication 36 to MSC 18 so that an assigned ESRK may be associated with the extant emergency service call placed by mobile calling unit 12. As mentioned earlier herein, systems commonly in place today establish a finite pool of emergency service keys ESRK/ESQK for allocation during operation.

The extant voice emergency service call placed by mobile calling unit 12 is then provided to a Selective Router/Call Routing Data Base (SR/CRDB) 22 accompanied by the assigned ESRK, as indicated by a communication line 38. SR/CRDB 22 is used to select which PSAP 24 receives an extant call. In situations where SR/CRDB 22 services more than one PSAP (only one PSAP 24 is shown in FIG. 1) location information must accompany the extant call. The accompanying location information may be employed by SR/CRDB 22 to ascertain which PSAP 24 should receive the call for action. PSAPs 24 generally assign responsibility for emergency response to a first responder or other agency having delineated geographic areas of responsibility. The geographic areas of responsibility are often based upon municipal boundaries such as county or city boundaries. Significant time may be saved in responding to an emergency reported via an emergency service call from a mobile calling unit 12 if the responsibility to respond can be assigned to an appropriately cognizant PSAP 24 at the outset. Such accurate assignment of responsibility can save valuable time in responding to life-threatening emergency situations. The extant call is provided, along with its assigned ESRK to PSAP 24, as indicated by communication line 40.

As the extant emergency service is being handled PSAP 24 may desire to re-determine location of mobile calling unit 12. PSAP may query an ALI 26 using the ESRK assigned to the extant emergency service call, as indicated by a communication line 42. Because the extant emergency service call is placed by a mobile calling unit (i.e., mobile calling unit 12), ALI 26 will not be able to provide location information relating to the extant emergency service call, and will therefore pose a query to locating unit 15, specifically to MPC 20. The query to MPC 20 may be in the form of, by way of example and not by way of limitation, an InterSystem Position Request (ISPOSREQ) signal accompanied by or incorporating the ESRK assigned to the extant emergency service call, as indicated by a communication line 44. MPC 20 queries PDE 16 to obtain an updated location relating to mobile calling unit 12. Alternately, MPC 20 may periodically query PDE 16 and thereby have an updated location relating to mobile calling unit 12. MPC 20 provides an updated location relating to mobile calling unit 12 to ALI 26, as indicated by a communication line 46. ALI 26 provides an updated location relating to mobile calling unit 12 to PSAP 24, as indicated by a communication line 48.

It may be preferred that PSAP 24 periodically query ALI 26 to maintain an up to date indication of location relating to mobile calling unit 12. Periodicity may be related to how quickly or how frequently location of mobile calling unit 12 changes. It may be most preferred that PSAP 24 substantially continually query ALI 26 to maintain an up to date indication of location relating to mobile calling unit 12.

MPC 20 can monitor receiving signal ISPOSREQ from ALI 26 relating to an ESRK assigned to an extant emergency service call and can note when such requests for location information updates cease; that is when signal ISPOSREQ is not any longer received. Cessation of requests may be considered to indicate that the extant emergency service call placed by mobile calling unit 12 has ceased. Cessation of requests may be considered to have occurred, by way of example and not by way of limitation, when a new such signal ISPOSREQ is not received relating to a particular ESRK after a predetermined time interval.

When it is determined that the emergency service call with which a given ESRK is assigned or otherwise associated is no longer extant, MPC 20 may return the particular ESRK to the pool of ESRKs for later reassignment.

In FIG. 1, a single solid communication line, such as for example communication lines 30, 32, 34, 36, 42, 44, 46, 48, is intended to indicate that the represented communication may be effected as part of a data communication. A double solid communication line, such as for example communication lines 38, 40, is intended to indicate that the represented communication may be effected as part of a voice communication.

Figure 2:
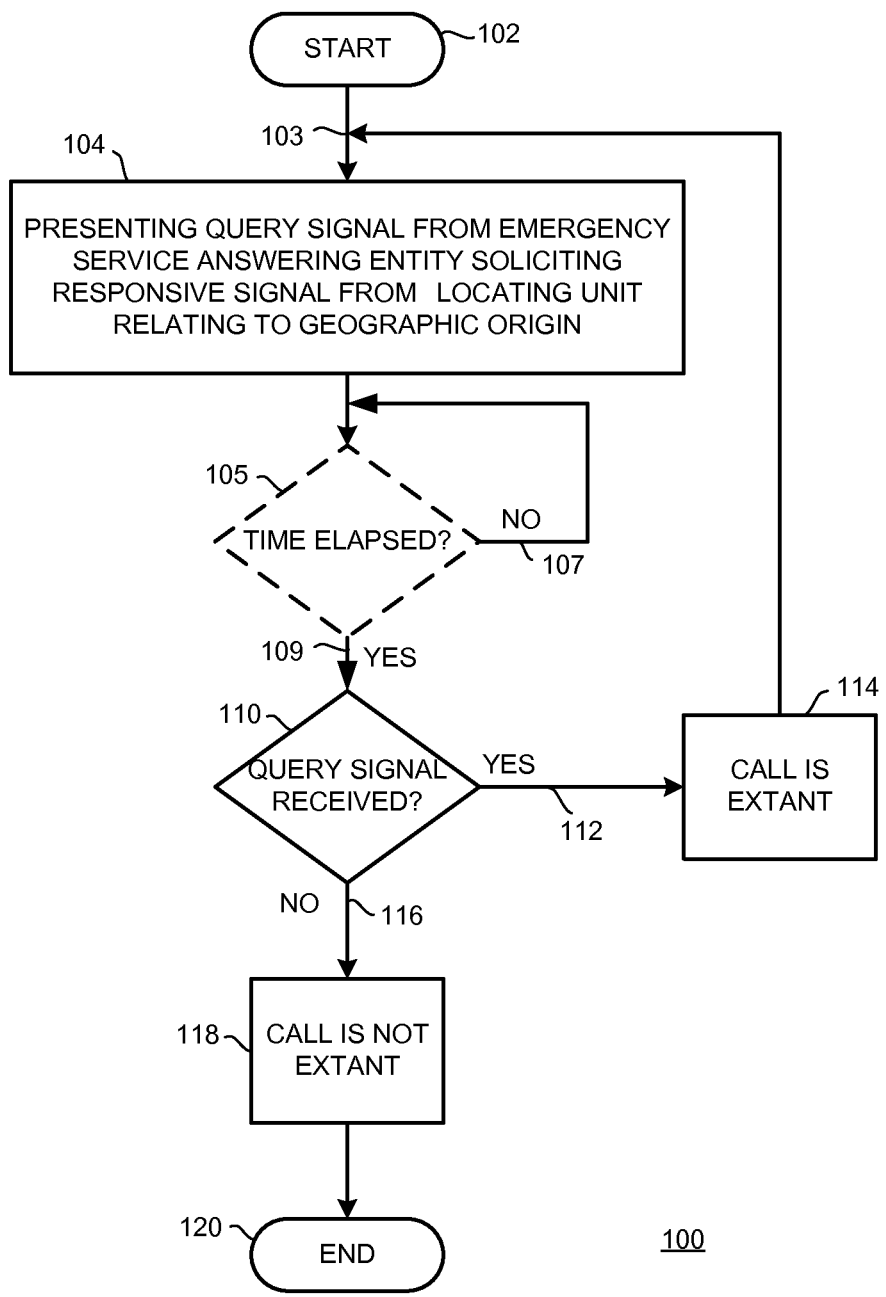
FIG. 2 is a flow diagram illustrating a method for determining termination of an emergency service call.

FIG. 2 is a flow diagram illustrating a method for determining termination of an emergency service call. In FIG. 2, a method 100 for determining termination of an emergency service call connected with an emergency service answering entity in an emergency service network employing a locating unit for ascertaining a geographic origin for the emergency service call begins at a START locus 102.

Method 100 continues with presenting a query signal from the emergency service answering entity during the emergency service call soliciting a responsive signal from the locating unit relating to the geographic origin, as indicated by a block 104.

Method 100 continues with posing a query whether the query signal relating to the geographic origin is received by the location unit, as indicated by a query block 110. A method step for determining whether a query signal should have been been received is indicated by a query block 105 posing a query whether a predetermined time interval has elapsed since the last query signal was received. If the predetermined time interval has not elapsed, method 100 may proceed from query block 105 via a NO response line to a locus 111. Method 100 may proceed thereafter from locus 111 to query block 105. If the predetermined time interval has elapsed, method 100 may proceed from query block 105 via a YES response line to a query block 110. Query block 105 is presented in dotted-line format to indicate its representative nature; other approaches may be employed to ascertain whether a responsive signal should have been received.

Query block 110 poses a query whether the query signal has been received by the location unit. If the query signal has been received by the location unit, method 100 proceeds from query block 110 via a YES response line 112 and the emergency service call is considered not terminated, as indicated by a block 114. Method 100 proceeds from block 114 to a locus 103 and thereafter proceeds as described via blocks 104, 105 (if employed) and 110.

If the query signal has not been received by the location unit, method 100 proceeds from query block 110 via a NO response line 116 and the emergency service call is considered terminated, as indicated by a block 118. Method 100 terminates at an END locus 120.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A method for determining termination of an emergency service call; said emergency service call being connected with an emergency service answering entity in an emergency service network employing a locating unit for ascertaining a geographic origin for said emergency service call; the method comprising:

(a) receiving a first signal from said emergency service network at said locating unit establishing to said locating unit existence of said emergency service call;

(b) monitoring arrival of subsequent query signals relating to said geographic origin arriving at said locating unit from said emergency service answering entity after receiving said first signal; each respective said subsequent query signal soliciting a responsive signal from said locating unit relating to said geographic origin;

(c) if a respective said subsequent query signal is received by said locating unit, within a first predetermined time interval, considering that said emergency service call is not terminated; and (d) if no respective said subsequent query signal is received by said locating unit, within a second predetermined time interval, considering that said emergency service call is terminated.

2. The method for determining termination of an emergency service call as recited in claim 1 wherein said subsequent query signals are presented periodically.

3. The method for determining termination of an emergency service call as recited in claim 1 wherein each said subsequent query signal is a system signal associated with operation of said locating unit.

4. The method for determining termination of an emergency service call as recited in claim 1 wherein each said subsequent query signal is associated with emergency service routing digits previously assigned in connection with said emergency service call.

5. The method for determining termination of an emergency service call as recited in claim 4 wherein said emergency service routing digits previously assigned in connection with said emergency service call are returned to a pool of emergency service routing digits for later reuse when said emergency service call is terminated.

6. The method for determining termination of an emergency service call as recited in claim 4 wherein each said subsequent query signal is a system signal associated with operation of said locating unit, and wherein said emergency service routing digits previously assigned in connection with said emergency service call are returned to a pool of emergency service routing digits for later reuse when said emergency service call is terminated.

7. The method for determining termination of an emergency service call as recited in claim 6 wherein each said subsequent signal is a system signal associated with operation of said locating unit.

8. A method for determining whether a previously in-progress emergency service call is extant; said previously in-progress emergency service call being connected with an emergency service answering entity in an emergency service network employing a locating unit for ascertaining a geographic origin for said previously in-progress emergency service call; the method comprising:

(a) monitoring a plurality of subsequent query signals at said locating unit from said emergency service answering entity; said subsequent query signals arriving at said locating unit after said locating unit receives a first signal establishing to said locating unit existence of said in-progress emergency service call; each said subsequent query signal soliciting a responsive signal from said locating unit relating to said geographic origin;

(b) if a respective said subsequent query signal is received by said locating unit, within a first predetermined time interval, considering that said previously in-progress emergency service call is extant; and (c) if no respective said subsequent query signal is received by said locating unit, within a second predetermined time interval, considering that said previously in-progress emergency service call is not extant.

9. The method for determining whether a previously in-progress emergency service call is extant as recited in claim 8 wherein said subsequent query signals are presented periodically.

10. The method for determining whether a previously in-progress emergency service call is extant as recited in claim 8 wherein each said subsequent query signal is a system signal associated with operation of said locating unit.

11. The method for determining whether a previously in-progress emergency service call is extant as recited in claim 8 wherein said responsive signal is associated with emergency service routing digits previously assigned in connection with said emergency service call.

12. The method for determining whether a previously in-progress emergency service call is extant as recited in claim 11 wherein said emergency service routing digits previously assigned in connection with said emergency service call are returned to a pool of emergency service routing digits for later reuse when said emergency service call is no longer extant.

13. The method for determining whether a previously in-progress emergency service call is extant as recited in claim 11 wherein each said subsequent query signal is a system signal associated with operation of said locating unit, and wherein said emergency service routing digits previously assigned in connection with said emergency service call are returned to a pool of emergency service routing digits for later reuse when said emergency service call is no longer extant.

14. The method for determining whether a previously in-progress emergency service call is extant as recited in claim 13 wherein each said subsequent query signal is a system signal associated with operation of said locating unit.

15. A method for determining whether a routing expression associated with a respective emergency service call should be disassociated with said respective emergency service call; said respective emergency service call being connected with an emergency service answering entity in an emergency service network employing a locating unit for ascertaining a geographic origin for said respective emergency service call; the method comprising:

(a) receiving a first signal from said emergency service network at said locating unit establishing to said locating unit existence of said emergency service call;

(b) monitoring arrival of subsequent query signals relating to said geographic location arriving at said locating unit from said emergency service answering entity after receiving said first signal; each said subsequent query signal soliciting a responsive signal from said locating unit relating to said geographic origin;

(c) if a respective said subsequent query signal is received by said locating unit, within a first predetermined time interval, considering that said routing expression associated with said respective emergency service call should not be disassociated with said respective emergency service call; and (d) if no said subsequent query signal is received by said locating unit, within a second predetermined time interval, considering that said routing expression associated with said respective emergency service call should be disassociated with said respective emergency service call.

16. The method for determining whether a routing expression associated with a respective emergency service call should be disassociated with said respective emergency service call as recited in claim 15 wherein said subsequent query signals are presented periodically.

17. The method for determining whether a routing expression associated with a subsequent emergency service call should be disassociated with said respective emergency service call as recited in claim 15 wherein each said respective query signal is a system signal associated with operation of said locating unit.

18. The method for determining whether a routing expression associated with a respective emergency service call should be disassociated with said respective emergency service call as recited in claim 15 wherein said responsive signal is associated with said routing expression; said routing expression being comprised of emergency service routing digits previously assigned in connection with said emergency service call.

19. The method for determining whether a routing expression associated with a respective emergency service call should be disassociated with said respective emergency service call as recited in claim 15 wherein said routing expression associated with said respective emergency service call is returned to a pool of routing expressions for later reuse when said respective emergency service call is terminated.

20. The method for determining whether a routing expression associated with a respective emergency service call should be disassociated with said respective emergency service call as recited in claim 16 wherein each said subsequent query signal is a system signal associated with operation of said locating unit, and wherein said routing expression associated with said respective emergency service call is returned to a pool of routing expressions for later reuse when said respective emergency service call is terminated.

* * * * *